United States Patent
Hehmann et al.

(10) Patent No.: US 8,180,217 B2
(45) Date of Patent: May 15, 2012

(54) METHOD FOR COORDINATING MEASUREMENTS AND CALIBRATIONS IN A PASSIVE OPTICAL NETWORK

(75) Inventors: Jörg Hehmann, Weil der Stadt (DE); Richard Heidemann, Beilstein (DE)

(73) Assignee: Alcatel Lucent, Paris (FR)

( * ) Notice: Subject to any disclaimer, the term of this patent is extended or adjusted under 35 U.S.C. 154(b) by 592 days.

(21) Appl. No.: 12/320,565

(22) Filed: Jan. 29, 2009

(65) Prior Publication Data
US 2009/0220226 A1 Sep. 3, 2009

(30) Foreign Application Priority Data
Feb. 4, 2008 (EP) .................. 08290111

(51) Int. Cl.
*H04B 10/08* (2006.01)
(52) U.S. Cl. ........................................ 398/25
(58) Field of Classification Search .......... 398/25, 398/55, 35, 77, 17
See application file for complete search history.

(56) References Cited

U.S. PATENT DOCUMENTS

| | | | | |
|---|---|---|---|---|
| 6,023,467 A | * | 2/2000 | Abdelhamid et al. | 370/236.2 |
| 6,636,527 B1 | * | 10/2003 | Lee et al. | 370/465 |
| 2009/0010643 A1 | * | 1/2009 | DeLew et al. | 398/17 |
| 2009/0202238 A1 | * | 8/2009 | Straub et al. | 398/25 |

OTHER PUBLICATIONS

"Gigabit-capable Passive Optical Networks (G-PON): Trasnmission convergence layer specification" ITU-T Telecommunication Standardization Sector of ITU, No. G.984.3, Feb. 2004.
Glen Kramer et al.: "IPACT: A Dynamic Protocol for an Ethernet PON (EPON)" IEEE Communications Magazine, vol. 40, No. 2, Feb. 2002.

\* cited by examiner

*Primary Examiner* — Jessica Stultz
*Assistant Examiner* — Tuan Nguyen
(74) *Attorney, Agent, or Firm* — Harness, Dickey & Pierce

(57) ABSTRACT

Method for coordinating measurements and calibrations in a passive optical network, PON, in particular in a Gigabit PON, the method comprising: generating, in an optical line termination (3), OLT, a downstream frame (25), transmitting the downstream frame (25) from the OLT to a plurality of optical network terminations (6.1 to 6.*n*), ONTs, the downstream frame (25) comprising at least one allocation structure (10) for allocating to at least one targeted ONT (6.1 to 6.*n*) a time slot for transmitting upstream data, the allocation structure (10) indicating that the type of upstream data to be transmitted during the allocated time slot is measurement data (26) or calibration data.

9 Claims, 1 Drawing Sheet

METHOD FOR COORDINATING MEASUREMENTS AND CALIBRATIONS IN A PASSIVE OPTICAL NETWORK

BACKGROUND OF THE INVENTION

The invention is based on a priority application EP08290111.7 which is hereby incorporated by reference.

The invention relates to a method for coordinating measurements and calibrations in a passive optical network, PON, in particular a Gigabit PON, and to a computer program product for implementing the method. The invention further relates to an optical network termination, ONT, and to a PON comprising at least one such ONT.

At the moment, new embedded measurement methods are being developed which will be integrated into the network management of future GPONs in order to measure the optical line profile via "optical time domain reflectometry" (OTDR). "Embedded" means that the PON doesn't have to be taken offline to perform the measurements, so that the measurements can be performed while the network is running. Typically, the measurements are performed on the wavelength of the actual data transmissions. However, certain calibrations and measurements need a special time window where no upstream data should be transmitted. For these time critical calibrations and measurements, coordination is required such that a minimum of time is needed to perform them in all affected parts (ONTs/Optical Network Units, ONUs) of the PON.

At present, for performing line profile measurements at the actual data transmission wavelength, the whole network has to be turned down. However, this is not an acceptable solution because a passive optical network is dependent on continuos operation (e.g. for synchronization and multimedia streams that should not be interrupted). Another option is to do line profile measurements at a different wavelength, but such measurements are not as accurate as measurements at the actual data transmission wavelength and not applicable in next generation wavelength division mulitplex (WDM) networks.

OBJECT OF THE INVENTION

It is the object of the invention to provide: a method, a computer program product, an optical network termination, and a passive optical network of the type described above which allow performing time critical embedded measurements at the data transmission wavelength.

SUMMARY OF THE INVENTION

This object is achieved by a method for coordinating measurements and calibrations in a passive optical network, PON, in particular in a Gigabit PON, the method comprising: generating, in an optical line termination, OLT, a downstream frame, transmitting the downstream frame from the OLT to a plurality of optical network terminations, ONTs, the downstream frame comprising at least one allocation structure for allocating to at least one targeted ONT a time slot for transmitting upstream data, the allocation structure indicating that the type of upstream data to be transmitted during the allocated time slot is measurement or calibration data.

For coordinating time-critical measurements and calibrations, the OLT which coordinates the traffic within the PON may be used. Similar to the fact that only one ONT/ONU can send (regular) upstream traffic in a specific time interval (as controlled by the OLT), there can be only upstream traffic OR calibrations OR measurements in a specific time interval. This can be coordinated by the OLT which indicates and allocates time slots for upstream traffic, calibrations and measurements.

For this purpose, the allocation structure of the downstream frame which is defined in the GPON protocol needs to be modified in order to allow the OLTs to recognize that calibration or measurement data has to be sent in upstream. Thus, the allocation structure of a GPON downstream frame is enhanced by using additional structures which indicate that measurements or calibrations should be performed. These structures may be implemented as specific bits of the allocation structure which are qualified as "unused" in the standard GPON protocol. In such a way, imminent calibrations or measurements may be indicated by an "upstream bandwidth" map containing allocation structures which reserve time slots for these actions while no other actions (e.g. data upload) can be performed in upstream direction, such that the targeted ONT(s)/ONU(s) can perform their calibrations/measurements in this time slot. In case that all ONTs/ONUs are targeted, the allocation ID 255 which is referred to as the "unassigned Alloc-ID" in the standard can be used to indicate time slots where every ONT/ONU can do calibrations or measurements (thus, the context of the present application, this allocation ID is used as a broadcast indication and is not "unused" as specified in the current standard.

In a preferred variant, no upstream data is received by the OLT during a measurement time interval between the start of the transmission of the downstream frame and the reception of the measurement or calibration data from the targeted ONT having maximum distance from the OLT. The one of the targeted ONTs which has maximum distance from the OLT is the one for which transmission of the downstream frame and of the upstream calibration or measurement data requires maximum time, thus defining the duration of the measurement time interval.

For certain types of measurements, in particular line profile measurements, it is not sufficient to block further (regular) upstream traffic in the network only during the time interval in which the transmission of the measurement or calibration data from the ONTs in upstream is performed, as part of the upstream data which is transmitted to the OLT is reflected back through the network and may also have an adverse effect on the measurements and calibrations. Therefore, it is advantageous to block the sending of upstream data from the ONTs to the OLT already from the start of the transmission of the downstream frame, i.e. before the calibration or measurement data is sent in the upstream direction. When no further upstream traffic is received by the OLT during the measuring time interval, no backscattering of upstream traffic at the OLT may occur before the measurement or calibration data is received.

In order to avoid the reception of upstream data during the measurement interval, also during a time interval before start of the measurement time interval, the OLT must not allocate time slots for sending upstream traffic which may be received at a point of time after the start of the measuring time interval. The duration of the time interval during which no such downstream frames may be transmitted depends on the signal propagation delay of the downstream frames from the OLT to the ONTs and back (both delays being equal), the duration of this time interval corresponding at most to two times the transmission time of a downstream frame from the OLT to the ONT having maximum distance from the OLT.

Preferably, during the measuring time interval, the OLT generates downstream frames which only allocate time slots for upstream data which is transmitted after the measurement time interval. In such a way, the generation and subsequent transmission of upstream data during the measurement time interval can be avoided. Alternatively, it is also possible not to generate any downstream frames during the measurement time interval which allocate time slots for upstream data, in the latter case the time interval during which no regular data can be transmitted through the network being increased.

In a preferred variant, the time slots allocated to the targeted ONTs are chosen in such a way that the measurement data or calibration data of different targeted ONTs is received concurrently at the OLT. When more than one ONT sends measurement data or calibration data, it is advantageous to coordinate the time slots in which the transmission of these data starts, such that only one superimposed signal (pulse or dummy data packet) is sent from the ONTs in the upstream direction, facilitating the measurements and calibrations by improving the signal-to-noise ratio of the upstream transmission.

A further aspect of the invention is implemented in an optical network termination, ONT, comprising: a data generation unit for generating measurement or calibration data in a time slot allocated by an allocation structure of a downstream frame indicating that the type of upstream data to be transmitted during the allocated time slot is measurement or calibration data. The ONT is adapted to inspect the allocation structure and to identify the indicator in order to prepare the sending of the calibration data or measurement data during the allocated time slot. Information about the calibration data or measurement data which is to be sent in upstream which may be provided from the OLT to the ONTs via a separate transmission channel, which may be provided by an ONT management and control interface (OMCI).

Another aspect of the invention is implemented in a PON, in particular Gigabit PON, comprising: a plurality of ONTs as described above, being arranged in branches of the PON which are connected to a main line, and an optical line termination, OLT, arranged at a head end of the main line, the OLT comprising: a frame generator for generating a downstream frame to be transmitted from the OLT to the ONTs, the downstream frame comprising at least one allocation structure for allocating to at least one targeted ONT a time slot for sending upstream data, the allocation structure generated by the frame generator being adapted to indicate that the type of upstream data to be transmitted in the allocated time slot is measurement data or calibration data. In such a PON, the transmission of regular upstream data, calibration data and measurement data can be coordinated by using an additional indicator in the downstream frame structure which allows to differentiate between these three types of data.

In a preferred embodiment, the frame generator of the OLT is adapted to generate only downstream frames which do not allocate time slots for transmitting upstream data received by the OLT during a measurement time interval between the start of the transmission of the downstream frame and the reception of the measurement or calibration data from the targeted ONT having maximum distance from the OLT. Moreover, the OLT is preferably adapted to generate only downstream frames during the measurement time interval which allocate time slots for upstream data which is transmitted after the measurement time interval. In such a way, no upstream traffic in the network may disturb the measurement or calibration process.

Preferably, the ONT further comprises a frame transmission time determination unit for determining the transmission time of the downstream frame from the OLT to the ONTs. The transmission time may be determined in the OLT by measuring the time interval between the start of the transmission of a downstream frame to a particular ONT and the reception of the data which is sent back from that ONT to the OLT.

In a highly preferred embodiment, the frame generator of the OLT is adapted to generate a downstream frame, in particular based on the structure of the Gigabit passive optical network protocol, having at least one allocation structure which comprises a flags field with a flag bit indicating that the type of upstream data to be transmitted during the allocated time slot is measurement data and a further flag bit indicating that the type of upstream data to be transmitted during the allocated time slot is calibration data. In the GPON protocol, a flags field is provided which comprises several bits which are specified as "reserved for future use" in the standard. Two of these bits may be used to indicate that calibration or measurement data should be transmitted during the allocated time slot. Usually, calibration data may be used to prepare a subsequent measurement, the information about the result of the calibration measurement being provided to the ONTs through a separate wavelength channel provided by an OMCI, such that the measurement data to be generated may be adapted in dependence of the result of the analyzing of the calibration data. The person skilled in the art will appreciate that although the OMCI can be used to exchange data, time-critical measurements or calibrations cannot be performed using this channel, as no clock is provided on this channel which would allow to synchronized the measurements and calibrations.

A final aspect of the invention is implemented in a computer program product comprising code for implementing the method described above. The computer program product may comprise code which is distributed among the elements of the PON, a first part of the code of the computer program product being implemented as software or hardware (e.g. ASIC, FPGA) in the OLT, another part in the ONTs.

Further features and advantages are stated in the following description of exemplary embodiments, with reference to the figures of the drawing, which shows significant details, and are defined by the claims. The individual features can be implemented individually by themselves, or several of them can be implemented in any desired combination.

BRIEF DESCRIPTION OF THE DRAWINGS

Exemplary embodiments are shown in the diagrammatic drawing and are explained in the description below. The following are shown.

DETAILED DESCRIPTION OF PREFERRED EMBODIMENTS

Figure 1:
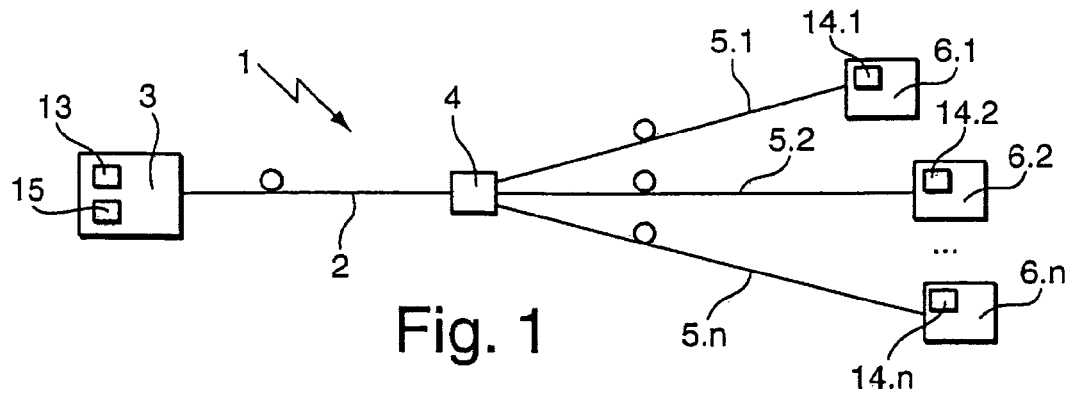
FIG. 1 a schematic diagram of an embodiment of a GPON according to the invention, FIG. 2 a GPON downstream frame structure with an allocation structure which comprises a flags field with two bits indicating that calibration or measurement data is to be sent in upstream, and FIG. 3 a time-distance diagram of the propagation of upstream and downstream traffic in the GPON of FIG. 1.

FIG. 1 shows a Gigabit passive optical network (GPON) 1, comprising a main fiber line 2 being located between an Optical Line Termination 3 and a 1×N passive optical distribution network (splitter) 4 connecting the main line 2 with a number n of branches, three of which (5.1, 5.2, 5.n) are shown in FIG. 1. Optical Network Terminations ONTs 6.1, 6.2, 6.n in the end users' premises are arranged at the end of the branches 5.1, 5.2, 5.n of the GPON 1. The person skilled in the art will appreciate that FIG. 1 only represents the basic structure of a PON and that real PONs are usually more complex.

Figure 2:
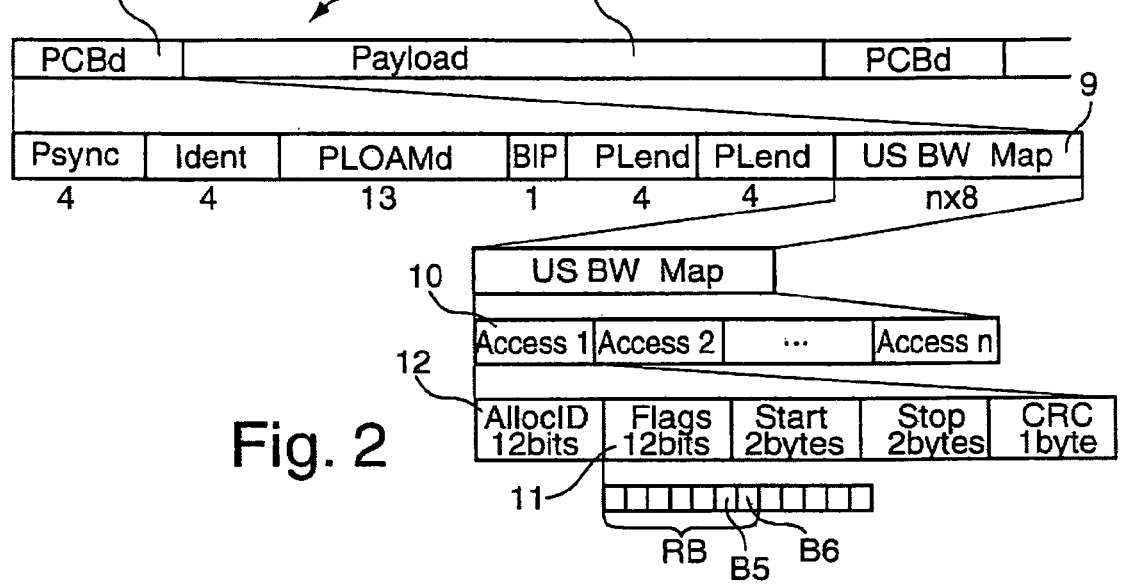

In the GPON 1 of FIG. 1, the OLT 3 coordinates the traffic by transmitting downstream frames to the optical network terminations 6.1 to 6.n. The structure of such a GPON downstream frame 7 as specified by the GPON protocol specification (ITU-T G.984.3) is shown in FIG. 2. The downstream frame 7 comprises a header 8a, also referred to as Physical Control Block downstream, PCBd, and a payload segment 8b. The header 8a comprises a structure which is referred to as Upstream Bandwidth map 9 which coordinates the data sent in upstream through the GPON 1. In the Upstream Bandwidth map 9, a plurality of allocation structures 10 is provided, each of which assigning a specific (dynamically adoptable) amount of time to a targeted ONT 6.1 to 6.n to send its upstream traffic.

Each allocation structure 10 comprises a flags field 11 indicating which type of data can or should be sent in upstream. The first seven bits RB of the Flags field 11 are reserved for future use. For coordinating measurements and calibrations, two of those bits may be assigned to signal time slots for calibration (e.g. bit 6, B6) and time slots for measurements (e.g. bit 5, B5). In such a way, an indicator that the type of upstream data to be transmitted during the allocated time slot should be measurement data or calibration data can be defined.

As each allocation structure 10 in the Upstream Bandwidth map 9 is associated with a specific target ONT 6.1 to 6.n, indicated by the so-called Allocation ID field 12, calibrations or measurements can also be assigned to specific targets. The allocation ID 255 of the GPON protocol is the so-called "unassigned Alloc-ID" which may be used—contrary to the current standard—for indicating time slots where all of the ONTs/ONUs of the GPON 1 can do calibrations or measurements.

The OLT 3 of FIG. 1 comprises a frame generator 13 which is adapted to generate the modified frame structure 7 shown in FIG. 2 by setting the two flag bits B5, B6 of the flags field 11 if measurements or calibrations are required. Also, each of the optical network terminations 6.1 to 6.n comprises a data generation unit 14.1 to 14.n which is adapted to check if one of the flag bits B5, B6 is set and which generates calibration or measurement data accordingly. In such a way, the optical line termination OLT 3 can coordinate the calibrations, the measurements, and the regular upstream traffic (user data upload).

Figure 3:
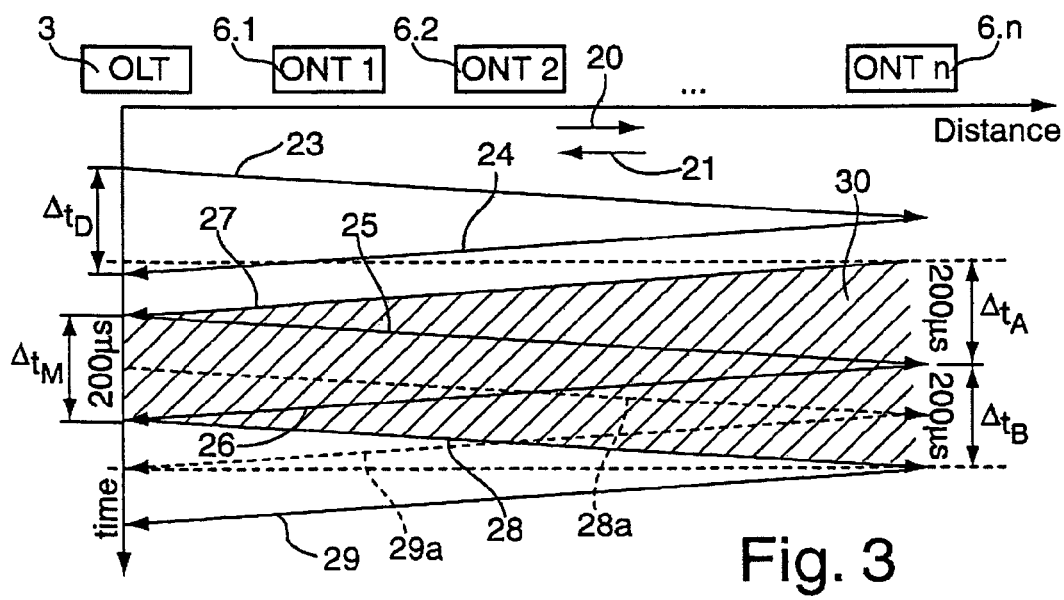

As the optical line termination OLT 3 controls whether and when the ONTs 6.1 to 6.n can send upstream traffic, the OLT 3 will not send an admission to send upstream data to any of the ONTs 6.1 to 6.n that could interfere with the measurements and calibrations, as will be explained in the following with respect to FIG. 3, showing the propagation of signals through the GPON 1 of FIG. 1 in a downstream direction 20 and in an upstream direction 21.

During normal operation of the GPON 1, the OLT 3 starts transmission of a downstream frame 23 which propagates through the GPON 1 up to the ONT 6.n which has maximum distance from the optical line termination OLT 3. The downstream frame 23 comprises an allocation structure which allocates a time slot for transmitting upstream data to the ONT 6.n, the flags field 11 of the allocation structure indicating that the type of data to be transmitted in the upstream direction 21 is user data 24.

A time interval $\Delta t_D$ between the start of the transmission of the downstream frame 23 and the reception of the user data 24 is measured in a frame transmission time determination unit 15 of the OLT 3 shown in FIG. 1. The transmission time of the downstream frame 23 from the OLT 3 to the ONT 6.n is defined by half of the measured value, i.e. $\Delta t_D/2$, as the downstream frame 23 and the upstream data 24 propagate with the same velocity through the GPON 1. In a similar way, the frame transmission times to the other optical network terminations 6.1, 6.2, . . . may be determined by the OLT 3. The knowledge of the frame transmission times can be used for coordinating the transmission of the upstream data sent from different ONTs 6.1 to 6.n, which will be described in detail further below.

For performing measurements or calibrations, the OLT 3 transmits a further downstream frame 25 which propagates through the GPON 1 up to the ONT 6.n which has maximum distance from the OLT 3, an allocation structure 10 of the downstream frame 26 addressing the ONT 6.n comprising a flags field 10 in which the fifth flag bit B5 is set, indicating that measurement data should be sent in the upstream direction 21 by the ONT 6.n. The data generation unit 14.n of the ONT 6.n recognizes that the fifth bit B5 is set and accordingly generates measurement data 26 which is transmitted in the upstream direction 21 as a short dummy packet having a time duration of e.g. 300 ns. A measurement time interval $\Delta t_M$ of e.g. 200 µs is defined as the difference between the start of the transmission of the downstream frame 25 and the reception of the measurement data 26 from the targeted ONT 6.n. The person skilled in the art will appreciate that the transmission of calibration data instead of measurement data may be performed in an analogous way.

During the measuring time interval $\Delta t_M$, no upstream traffic may be received by the OLT 3, as part of the received upstream traffic would be scattered back and would have an adverse effect on the measurements. As the OLT 3 has control of the upstream traffic, it generates only downstream frames which do not allocate time slots for transmitting upstream data which may be received during the measurement time interval $\Delta t_M$. Consequently, the last regular upstream data 27 may be transmitted by the OLT 6.n at the start of a time interval $\Delta t_A$ before the measurement data 26 is sent from the OLT 6.n in the upstream direction 21, the length of the time interval $\Delta t_A$ corresponding to the length of the measurement time interval $\Delta t_M$.

Moreover, for not disturbing the measurements, during the measurement time interval $\Delta t_M$, the OLT 3 generates only downstream frames which allocate time slots for upstream data transmitted after the measurement time interval $\Delta t_M$, e.g. a downstream frame 28a. In this case, the first upstream data 29a from the ONT 6.n will be received by the OLT 3 a time interval $\Delta t_B$ after the start of the transmission of the measurement data 26, the duration of the time interval $\Delta t_B$ corresponding to the duration of the measurement time interval $\Delta t_M$.

Alternatively, the first downstream frame 28 used for allocating time slots for regular upstream data may be transmitted from the OLT 3 only at the end of the measurement time interval $\Delta t_M$. In this case, the first regular upstream data 29 can be sent by the ONT 6.n only a time interval $\Delta t_B$ after the start of the transmission of the measurement data 26. Therefore, the OLT 6.n cannot send regular upstream data during a time interval corresponding to two times the measurement time interval $\Delta t_M$, i.e., in the present example, for 400 µs, which is 100 µs longer as compared to the case described above.

In the example given above, only the optical network termination ONTn having maximum distance from the optical line termination OLT has been allocated a time slot for transmitting the measurement data 26 in the upstream direction 21. However, the downstream frame structure 7 may be used to allocate time slots for sending upstream data to more than one of the ONTs 6.1 to 6.n. In this case, the transmission of the measurement or calibration data sent in the upstream direction 21 should be coordinated, such that the measurement or calibration data of all of the targeted ONTs 6.1 to 6.n is received concurrently in the optical line termination OLT 3. This can be achieved by allocating the time slots for the upstream transmission in such a way that the start of the transmission of the measurement or calibration data of the ONTs 6.1, 6.2, . . . which are closer to the OLT 3 than the OLT 6.n is delayed by an appropriate time interval, which can be determined based on the information from the transmission time determining unit 15.

In any case, once the measurement or calibration data is analyzed in the OLT 3, information about the results may be transmitted back to the ONTs 6.1 to 6.n over an OMCI channel (not shown). In such a way, the measurement data transmitted in upstream may be influenced by the results of the calibration.

It is worth mentioning that the ONT 6.n is the one of the targeted ONTs which has maximum distance from the OLT 3, it being possible that further ONTs (not shown) which are not targeted by the downstream frame 25 are present in the GPON 1, these ONTs being arranged farther away from the OLT 3 as the targeted ONT 6.n. Also in this case, the OLT 3 has to ensure that these further ONTs do not transmit upstream data during the measurement time interval $\Delta t_M$, which may be achieved by keeping the hatched region 30 of the distance-time diagram of FIG. 3 free from upstream traffic.

The essential benefit of the solution described above is that it enables its user to perform online measurements and calibrations and thus network surveillance at an unrivaled accuracy, because these measurements and calibrations can be performed while the network is running and they are performed at the actual data transmission wavelength and only a measurement at the appropriate wavelength shows how suitable the line is for transport of the actual data signals. Consequently, the solution proposed above enables its user to offer unrivaled network performance, stability and quality, because network faults can be predicted before they occur (deterioration of network components can be monitored and failures of components can be predicted). Thus, the solution described above allows for the operation of calibration and measurement routines as an integral part of the transmission scheme without affecting the data traffic performance.

The above description of the preferred embodiments has been given by way of example. From the disclosure given, those skilled in the art will not only understand the present invention and its attendant advantages, but wilt also find apparent various changes and modifications to the structures and methods disclosed. The applicant seeks, therefore, to cover all such changes and modifications as fall within the spirit and scope of the invention, as defined by the appended claims, and equivalents thereof.

The invention claimed is:

1. A method for coordinating measurements and calibrations in a gigabit passive optical network (GPON), the method comprising:
   generating, in an optical line termination (OLT), a downstream frame, the downstream frame including at least one allocation structure, the at least one allocation structure configured to allocate to at least one targeted optical network termination (ONT) a time slot for transmitting upstream data, the allocation structure including a flags field, the flags field indicating that the type of data to be transmitted during the allocated time slot is user data and the flags field includes a first flag bit, the first flag bit indicating that the type of upstream data to be transmitted during the allocated time slot is measurement data and a second flag bit, the second flag bit indicating that the type of upstream data to be transmitted during the allocated time slot is calibration data;
   transmitting, by the OLT, the downstream frame to a plurality of targeted ONTs;
   generating, by at least one of the targeted ONTs, user data as the upstream data if the downstream frame indicates that the type of upstream data to be transmitted during the allocated time slot is user data;
   generating, by at least one of the targeted ONTs, measurement data as the upstream data if the downstream frame indicates that the type of upstream data to be transmitted during the allocated time slot is measurement data;
   generating, by at least one targeted ONT, calibration data as the upstream data if the downstream frame indicates that the type of upstream data to be transmitted during the allocated time slot is calibration data; and
   transmitting, by at least one of the targeted ONTs, the upstream data using the allocated timeslot.

2. The method according to claim 1, wherein no upstream data is received by the OLT during a measurement time interval between the start of the transmission of the downstream frame and the reception of the measurement or calibration data from the targeted ONT having maximum distance from the OLT.

3. The method according to claim 2, wherein during the measuring time interval, the OLT only generates downstream frames which allocate time slots for upstream data which is transmitted after the measuring time interval.

4. The method according to claim 1, wherein the time slots allocated to the targeted ONTs are chosen that the measurement data or calibration data of different targeted ONTs is received concurrently at the OLT.

5. Computer program product including a non-transitory memory having code segments stored thereon, that when executed by a processor cause the processor to implement the method according to claim 1.

6. A gigabit passive optical network, GPON, comprising:
   a plurality of optical network terminations, ONT, arranged in branches of the GPON which are connected to a main line, each of the ONTs including a data generation unit configured to,
   generate user data when a flags field of an allocation structure of a downstream frame indicates that the type of upstream data to be transmitted during the allocated time slot is user data
   generate measurement data when a flag bit of the flags field indicates that the type of upstream data to be transmitted during the allocated time slot is measurement data, and
   generate calibration data when a further flag bit of the flags field indicates that the type of upstream data to be transmitted during the allocated time slot is calibration data; and
   an optical line termination, OLT, arranged at a head end of the main line, the OLT including a frame generator configured to,
   generate a downstream frame to be transmitted from the OLT to the ONTs, the downstream frame comprising at least one allocation structure for allocating to at least one targeted ONT a time slot for sending upstream data, and
   generate an allocation structure including the flags field has a flag bit indicating that the type of upstream data to be transmitted during the allocated time slot is measurement data and the further flag bit indicating that the type of upstream data to be transmitted during the allocated time slot is calibration data.

7. The GPON according to claim 6, wherein the frame generator of the OLT is configured to generate only downstream frames which do not allocate time slots for transmitting upstream data received by the OLT during a measurement time interval between the start of the transmission of the downstream frame and the reception of the measurement data or calibration data from the targeted ONT having maximum distance from the OLT.

8. The GPON according to claim 7, wherein the OLT further comprises a frame transmission time determination unit for determining the transmission time of the downstream frame from the OLT to the ONTs.

9. The GPON according to claim 6, wherein the frame generator of the OLT is adapted to generate a downstream frame, in particular based on the structure of the Gigabit passive optical network protocol, having at least one allocation structure which comprises a flags field with a flag bit indicating that the type of upstream data to be transmitted during the allocated time slot is measurement data and a further flag bit indicating that the type of upstream data to be transmitted during the allocated time slot is calibration data.

* * * * *